Patented Oct. 13, 1953

2,655,444

UNITED STATES PATENT OFFICE 2,655,444

3-(HALOPHENYL)-1,1-DIALKYL UREAS AND WEED CONTROL COMPOSITIONS AND METHODS

Charles W. Todd, Wilmington, Del., assignor to E. I. du Pont de Nemours & Company, Wilmington, Del., a corporation of Delaware No Drawing. Application February 14, 1952, Serial No. 271,631

8 Claims. (Cl. 71—2.6)

This invention relates to methods for killing or preventing weeds, or undesirable plant growth, and to compositions employed in practicing such methods.

This application is a continuation-in-part of my copending applications: Serial No. 131,498 filed December 6, 1949, Serial No. 186,118 filed September 21, 1950, Serial No. 231,061 filed June 11, 1951, Serial No. 231,062 filed June 11, 1951, and Serial No. 228,992 filed May 29, 1951, all of which are now abandoned except application Serial No. 186,118.

The herbicidally active compounds of the invention are substituted ureas represented by the formula:

(1)
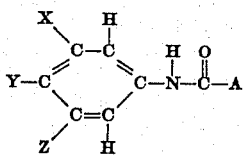

where A is a secondary amino radical selected from methylpropylamino, methylbutylamino and diethylamino radicals, X and Z are selected from hydrogen and halogen, and Y is selected from hydrogen, halogen, alkyl, or alkoxy, the alkyl radical in said alkyl and alkoxy substituents containing up to four carbon atoms, and at least one and at most two of X, Y, and Z being halogen.

Y in Formula 1 above is preferably hydrogen, chlorine, methyl, ethyl, or methoxy, and halogen substituents on the benzene nucleus are preferably chlorine.

The herbicidally active compounds of the invention are prepared by the reaction of an appropriate mono- or dihalo-substituted phenyl isocyanate with a secondary amine selected from methylpropylamine, methylbutylamine, and diethylamine, the propyl or butyl radicals of the amines in said group being either straight or branched chain. The following equation showing specific reactants illustrates the reaction:

(2)
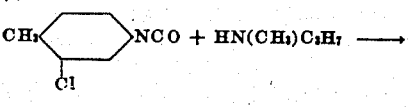
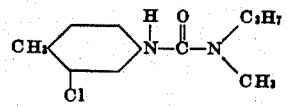

The amine-isocyanate reaction is most readily carried out in the presence of an inert solvent, such as, toluene, anisole, benzene, chlorobenzene, or dioxane. No catalyst is needed, and since the reaction is exothermic it is ordinarily unnecessary to supply heat. Thus the reaction is conveniently carried out by first mixing the isocyanate with the inert solvent at room temperature and then gradually adding the secondary amine reactant while permitting the temperature to increase thru the range of say 25 to 75° C. The tri-substituted urea products are generally quite insoluble in the solvent used and, therefore, precipitate out as formed and are readily separated from the reaction mass.

The halophenyl dialkyl ureas of the invention are white crystalline solids. They are insoluble or only slightly soluble in water and cold benzene and, in general, appreciably soluble in dioxane, acetone, ethylacetate, ethanol, and hot benzene.

The halophenyl isocyanates used as starting materials can be prepared by the general method described in the literature [Vittenet, Bull., Soc. Chim. 3 21, 586, 954 (1899); Organic Synthesis, Collective, vol. II, page 453; and U. S. Patent 2,428,843] which consists in heating the haloaryl carbamyl chloride first obtained by treating the haloaryl primary amine with phosgene at ordinary temperature in the presence of an appropriate solvent or reaction media.

Illustrative of the herbicidally active compounds of the invention represented by Formula 1 above are:

3 - (p - chlorophenyl) - 1 - methyl - 1 - isopropylurea
3 - (m - fluorophenyl) - 1 - methyl - 1 - isopropylurea
3 - (m - chlorophenyl) - 1 - methyl - 1 - isopropylurea
3 - (p - bromophenyl) - 1 - methyl - 1 - isopropylurea
3 - (p - iodophenyl) - 1 - methyl - 1 - isopropylurea
3 - (3 - bromo - 4 - chlorophenyl) - 1 - methyl - 1 - isopropylurea
3 - (3,5 - dichloro - 4 - methoxyphenyl) - 1 - methyl - 1 - isopropylurea
3 - (p - chlorophenyl) - 1 - methyl - 1 - n - butylurea
3 - (m - chlorophenyl) - 1 - methyl - 1 - n - butylurea
3 - (3,4 - dichlorophenyl) - 1 - methyl - 1 - n - butylurea
3 - (3 - chloro - p - tolyl) - 1 - methyl - 1 - n - butylurea
3 - (3,4 - dichlorophenyl) - 1 - methyl - 1 - isopropylurea 3 - (3 - chloro - p - tolyl) - 1 - methyl - 1 - isopropylurea
3 - (3,5 - dichloro - p - tolyl) - 1 - methyl - 1 - isopropylurea
3 - (3 - bromo - p - tolyl) - 1 - methyl - 1 - isopropylurea
3 - (p - chlorophenyl) - 1,1 - diethylurea
3 - (m - fluorophenyl) - 1,1 - diethylurea
3 - (m - chlorophenyl) - 1,1 - diethylurea
3 - (p - bromophenyl) - 1,1 - diethylurea
3 - (p - bromophenyl) - 1 - methyl - 1 - sec. butylurea
3 - (p - chlorophenyl) - 1 - methyl - 1 - tert. butylurea
3 - (3,4 - dichlorophenyl) - 1 - methyl - 1 - tert. butylurea
3 - (m - chlorophenyl) - 1 - methyl-1-n-propylurea
3 - (p - bromophenyl) - 1 - methyl - 1 - n - propylurea
3 - (p - iodophenyl) - 1 - methyl - 1 - n - propylurea
3 - (3,4 - dichlorophenyl) - 1 - methyl - 1 - n - propylurea
3 - (3 - chloro - p - tolyl) - 1 - methyl - 1 - n - propylurea
3 - (3 - chloro - 4 - ethylphenyl) - 1 - methyl - 1 - isopropylurea
3 - (3 - chloro - 4 - isopropylphenyl) - 1 - methyl - 1 - isopropylurea
3 - (3 - chloro - 4 - sec.butylphenyl) - 1 - methyl - 1 - isopropylurea
3 - (p - chlorophenyl) - 1 - methyl - 1 - isobutylurea
3 - (m - chlorophenyl) - 1 - methyl - 1 - isobutylurea
3 - (3,4 - dichlorophenyl) - 1 - methyl - 1 - isobutylurea
3 - (3 - chloro - p - tolyl) - 1 - methyl - 1 - isobutylurea
3 - (p - iodophenyl) - 1,1 - diethylurea
3 - (3,4 - dichlorophenyl) - 1,1 - diethylurea
3 - (3 - chloro - p - tolyl) - 1,1 - diethylurea
3 - (3,5 - dichloro - p - tolyl) - 1,1 - diethylurea
3 - (3 - chloro - 4 - ethylphenyl) - 1,1 - diethylurea
3 - (p - chlorophenyl) - 1 - methyl - 1 - sec. butylurea
3 - (m - chlorophenyl) - 1 - methyl - 1 - sec. butylurea
3 - (3,4 - dichlorophenyl) - 1 - methyl - 1 - sec. butylurea
3 - (3 - chloro - p - tolyl) - 1 - methyl - 1 - sec. butylurea
3 - (3 - chloro - 4 - methoxyphenyl) - 1 - methyl - 1 - isopropylurea
3 - (3 - chloro - 4 - isopropoxyphenyl) - 1 - methyl - 1 - isopropylurea
3 - (p - chlorophenyl) - 1 - methyl - 1 - n - propylurea
3 - (m - fluorophenyl) - 1 - methyl - 1 - n - propylurea For application of the herbicidally active compounds of the invention, the compounds are preferably admixed with a carrier material or conditioning agent of the kind used and referred to in the art as a pest control adjuvant or modifier in order to provide formulations adapted for ready and efficient application to soil, weeds, or unwanted plants using conventional applicator equipment.

Thus, one or more of the herbicidally active compounds of the invention are admixed with carrier or adjuvant materials to provide formulations in liquid or solid form. For example, solutions of the compounds of the invention in organic solvents, such as cyclohexanol, furfural, acetone, isobutanol, ethanol, isopropylacetate, and the like can be applied directly as herbicides. More economical and practical formulations are prepared by admixing or dispersing the herbicidally active compounds with a non-solvent carrier which may be either solid or liquid.

Thus, herbicidal dust compositions are compounded to give homogeneous free-flowing dust by admixing the active compounds with finely divided solids, preferably, talcs, natural clays, pyrophyllite, diatomaceous earth, and flours such as walnut shell, wheat, red wood, soya bean, and cottonseed flours. Other inert solid carriers which can be used to prepare the herbicidal formulations include magnesium and calcium carbonates, calcium phosphate, sulfur, lime, etc. either in powder or granular form. The percentage by weight of the essential active ingredients will vary according to the manner in which the composition is to be applied but, in general, will be 0.5 to 95% by weight of the herbicidal composition.

Liquid herbicidal compositions can contain, for example, one of the active herbicidal compounds of the invention dispersed in water or other non-solvent carrier. To secure such homogeneous dispersions, a surface-active agent is used. In fact, the preferred herbicidal compositions of this invention whether in liquid or in solid form contain the herbicidally active compound homogeneously admixed with a surface-active agent sometimes referred to in the art as wetting, dispersing or penetrating agents. These agents, which will be referred to hereinafter more simply as surface-active dispersing agents, cause the compositions to be easily dispersed in water to give aqueous sprays which, for the most part, constitute a desirable method of application.

The surface-active dispersing agents employed can be of the anionic, cationic or nonionic type and include, for example, sodium and potassium oleates, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions of the invention can also have incorporated therein oils, fats or similar vehicles such as cottonseed oil, olive oil, lard, paraffin oil, hydrogenated vegetable oils, etc. Adhesives such as gelatin, blood albumin, resins, for example, rosin, alkyd resins and the like, can also be used in certain compositions to increase retention or tenacity of deposits following application.

Water-dispersible liquid compositions can be prepared by incorporating with the ureas and surface-active dispersing agents various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in these water-dispersible herbicidal compositions.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms, it will be convenient to use a pellet form of the composition.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i. e., whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The class of herbicidally active compounds of this invention has characteristics which make the compounds especially valuable for herbicidal uses. In application to soil, they are effective at low dosage for control of weeds without damage to deep-rooted crop plants. They act to kill the weed seedlings which germinate near the surface of the soil before the weeds have had time to develop a deep root system.

The solid and liquid compositions described and employed herein for application of the essential active herbicidal ingredient all have the common property of permitting application of the herbicidal compositions through suitable jets, nozzles, or spreaders adapted to the handling of granular materials onto the plants being treated and will, for convenience, be designated as "fluent carriers." The fluent carriers with which this invention is primarily concerned are non-solvent fluent carriers.

In another method of application for weed control, the ureas are incorporated with fertilizers to form either powdery or granular herbicidal compositions that can be used in the cultivation of agricultural crops.

In order that the invention may be better understood, the following examples are given in addition to the examples already given above. The examples illustrate typical compounds of the invention, methods for their preparation, herbicidal formulations employing such compounds, herbicidal applications, and the results obtained.

EXAMPLE 1

To a stirred solution of 36.5 parts of diethylamine in 258 parts of dry dioxane was added dropwise 77 parts of p-chlorophenyl isocyanate with the evolution of heat. The temperature was maintained at 20–30° C. After cooling the reaction mixture to 15° C., the solid, white crystalline product which separated was filtered and dried in a vacuum (30 mm.) oven at 50° C. The 3-(p-chlorophenyl)-1,1-diethylurea thus obtained melted at 116.5–117° C. and amounted to 80 parts. A second crop of the above urea, melting point 116–117° C., was obtained by pouring the filtrate into 500 parts of water, and filtering and drying the resulting precipitate. The combined yield amounted to 98% of the theory.

Analysis calc'd. for $C_{11}H_{15}ClN_2O$: C, 58.40; H, 6.68. Found: C, 58.19, 58.45; H, 6.73, 6.72.

EXAMPLE 2

A solution of 500 parts of p-chlorophenyl isocyanate in 102 parts of dry dioxane was added dropwise to a stirred solution of 262 parts of diethylamine in 507 parts of dry dioxane at a rate sufficient to produce refluxing from the heat liberated in this exothermic reaction. After the addition was completed, stirring was continued until the temperature of the reaction mixture had dropped to 25° C. The white crystals which had separated were filtered, washed with water and dried at 50° C. in a vacuum (30 mm.) oven. The first crop of 3-(p-chlorophenyl)-1,1-diethylurea melting at 116.5–117° C. amounted to 596 parts. A second crop of 116.8 parts of this urea, melting point 115.5–116° C., was obtained on pouring the filtrate into 2,000 parts of water and filtering and drying the resulting precipitate.

EXAMPLE 3

Methyl-n-propylamine (18.2 parts by weight) was added slowly with stirring to a solution of 38.4 parts by weight of m-chlorophenyl isocyanate in 150 parts by weight of toluene at room temperature. The mixture was heated to reflux temperature and maintained at that temperature for thirty minutes. On cooling, 48.3 parts by weight (85% of theoretical yield) of 3-(m-chlorophenyl)-1-methyl-1-n-propylurea precipitated and was separated and dried; m. p. 99–101° C.

Analysis calc'd. for $C_{11}H_{15}ClN_2O$: N, 12.36. Found: N, 12.10.

EXAMPLE 4

Methyl-n-butylamine (21.8 parts by weight) was added gradually with stirring to 38.4 parts by weight p-chlorophenyl isocyanate in 150 parts by weight toluene at room temperature. The mixture was heated to reflux temperature and maintained at that temperature for thirty minutes. On cooling, white crystalline 3-(p-chlorophenyl)-1-methyl-1-n-butylurea precipitated and was separated and dried. The yield was 50.3 parts by weight (83% of theoretical); M. P. 116–7° C.

Analysis calc'd. for $C_{12}H_{17}ClN_2O$: N, 11.64. Found: N, 11.58.

Additional examples of the herbicidally active compounds of this invention prepared according to the foregoing methods are given in the following table:

| Name of Compound | Reactants | |
|---|---|---|
| | Isocyanate | Amine |
| Example 5: 3-(m-fluorophenyl)-1,1-diethylurea. M. P. 90.5–91.0° C., yield 87.5%. Calc'd. for $C_{11}H_{15}FN_2O$: C, 62.90; H, 7.20. Found: C, 62.89; H, 7.33. | m-Fluorophenyl | Diethyl |
| Example 6: 3-(m-chlorophenyl)-1,1-diethylurea. M. P. 89.5–90.0° C., yield 99%. Calc'd. for $C_{11}H_{15}ClN_2O$: C, 58.35; H, 6.67. Found: C, 58.01; H, 6.50. | m-Chlorophenyl | Do. |
| Example 7: 3-(p-bromophenyl)-1,1-diethylurea. M. P. 121° C., yield 81%. Calc'd. for $C_{11}H_{15}BrN_2O$: C, 48.75; H, 5.58. Found: C, 48.85; H, 5.57. | p-Bromophenyl | Do. |
| Example 8: 3-(p-iodophenyl)-1,1-diethylurea. M. P. 118.0–118.5° C., yield 99%. Calc'd. for $C_{11}H_{15}IN_2O$: C, 41.50; H, 4.75. Found: C, 41.68; H, 4.84. | p-Iodophenyl | Do. |
| Example 9: 3-(m-chlorophenyl)-1-methyl-1-n-butylurea. M. P. 113–4° C., yield 83%. Calc'd. for $C_{12}H_{17}ClN_2O$: N, 11.64. Found: N, 11.63. | m-Chlorophenyl | Methyl-n-butylamine |

EXAMPLE 10

Dust formulations

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 3 - (p - chlorophenyl) - 1 - methyl - 1 - isopropylurea | 20 |
| Talc | 80 |
| | 100 |

B

| | |
|---|---|
| 3 - (3 - chloro - p - tolyl) - 1 - methyl - 1 - sec.butylurea | 5 |
| Cottonseed oil | 4 |
| Walnut shell flour | 91 |
| | 100 |

EXAMPLE 11

Water-dispersible powders

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 3 - (3,4 - dichlorophenyl) - 1 - methyl - 1 - isopropylurea | 75 |
| Fuller's earth | 23.75 |
| Sodium lauryl sulfate, 50% (wetting agent) | 1 |
| Methyl cellulose, 15 cps. (dispersing agent) | .25 |
| | 100 |

B

| | |
|---|---|
| 3 - (m - chlorophenyl) - 1 - methyl - 1 - n - propylurea | 80 |
| Sodium disulfonate of dibutyl phenylphenol (wetting and dispersing agent) | 2 |
| Bentonite | 18 |
| | 100 |

EXAMPLE 12

Oil-water dispersible powders

The following powdered compositions are adapted for use in the preparation of spray compositions using either an oil, water, or a combination of oil and water as the liquid diluent. The powders are made by mixing and grinding as in the case of the powders of Example 10.

A

| | |
|---|---|
| 3 - (p - bromophenyl) - 1 - methyl - 1 - isobutylurea | 70 |
| Alkylated aryl polyether alcohol (wetting and dispersing agent) | 4 |
| Fuller's earth | 26 |
| | 100 |

B

| | |
|---|---|
| 3 - (3 - chloro - 4 - methoxyphenyl) - 1 - methyl - 1 - isopropylurea | 80 |
| Ethylene oxide stearate-laurate (emulsifying agent) | 4 |
| Pyrophyllite | 16 |
| | 100 |

EXAMPLE 13

Water-dispersible liquid compositions

The following compositions are in a liquid form and are adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agent or agents in an organic liquid diluent.

A

| | |
|---|---|
| 3 - (p - chlorophenyl) - 1 - methyl - 1 - n - butylurea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3 - (3,5 - dichloro - p - tolyl) - 1,1 - diethylurea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 14

*Granular compositions*

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty-second to one-quarter inch diameter.

A

| | |
|---|---|
| 3 - (3,4 - dichlorophenyl) - 1 - methyl - 1 - sec.butylurea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| 3 - (3,4 - dichlorophenyl) - 1,1 - diethylurea | 7 |
| Goulac | 3 |
| Refined kerosene | 1 |
| Gelatin | 25 |
| Talc | 64 |
| | 100 |

EXAMPLE 15

A mixture of 1 part of 3-(p-chlorophenyl)-1,1-diethylurea and 1 part of the acetate salt of a polyamine obtained from reductive amination of ethylene/carbon monoxide polymer was dissolved in sufficient methanol to make 80 parts of solution suitable for spraying as a herbicide. Thirty-six (36) days after spraying this formulation on narrow-leaved plantain and mature quack grass, the former was dead and the quack grass was barely alive. Other organic solvents which can be used in place of methanol in compounding the herbicidal composition of the above urea include acetone, isopropanol, cyclohexanol, isopropylacetate, and the like.

EXAMPLE 16

A water-dispersible powder made by admixing 75 parts of 3-(p-chlorophenyl)-1,1-diethylurea, 2 parts of alkylnaphthalene sodium sulfonate ("Alkanol" B), 3 parts of goulac and 20 parts of clay (Attaclay) was dispersed in water to give a 3% concentration of the urea. This dispersion was sprayed on quack grass. At the end of eleven weeks, the quack grass was completely killed. In a control test, an aqueous spray containing 10% sodium trichloroacetate applied to the same type of grass failed to kill the roots.

Following is a tabulation of results obtained with formulations of various herbicidally active compounds of the invention. In each case, the formulation employed contained 80% by weight of the herbicidally active compound, 18% by weight of powdered solid diluent, and 2% by weight of wetting and dispersing agents.

Formulations of each of the compounds were dispersed in water to give aqueous spray compositions. Each aqueous dispersion was sprayed on established quack grass which had been cut off at ground level (one-eighth to one-quarter inch). The applications were made at different dosages or rates. The dosage in terms of pounds per acre shown in the following table was that of the herbicidally active compound which was sufficient to effect kill of the quack grass in three months.

| Example | Compound | Dosage in lbs./acre |
|---|---|---|
| 17 | 3-(p-chlorophenyl)-1,1-diethylurea | 36 |
| 18 | 3 - (p - chlorophenyl) - 1 - methyl - 1 - n - propylurea | 18 |
| 19 | 3 - (p - chlorophenyl) - 1 - methyl - 1 - n - butylurea | 36 |
| 20 | 3 - (m - chlorophenyl) - 1 - methyl - 1 - n - butylurea | 36 |

Those skilled in the art will appreciate that other herbicidally active compounds of the class defined herein can be prepared, formulated, and applied in accordance with the foregoing specific examples. Thus, the foregoing detailed description has been given for clearness of understanding only and no unnecessary limitations are to be understood therefrom.

I claim:

1. A method for the destruction and prevention of weeds which comprises applying to a locus to be protected, in amount sufficient to exert a herbicidal action, a trisubstituted urea represented by the formula

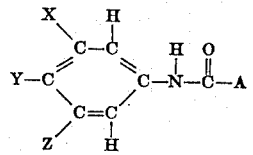

where A is a secondary amino radical selected from the group consisting of methylpropylamino, methylbutylamino and diethylamino radicals, X and Z are selected from the group consising of hydrogen and halogen, and Y is selected from the group consisting of hydrogen, halogen, alkyl, and alkoxy, the alkyl radical in said alkyl and alkoxy substitutents containing up to four carbon atoms, and at least one and at most two of X, Y, and Z being halogen.

2. A composition suitable for destroying weeds comprising a carrier material and, in amount sufficient to exert a herbicidal action, a trisubstituted urea represented by the formula

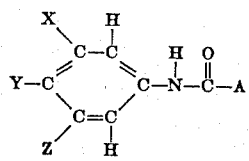

where A is a secondary amino radical selected from the group consisting of methylpropylamino, methylbutylamino and diethylamino radicals, X and Z are selected from the group consisting of hydrogen and halogen, and Y is selected from the group consisting of hydrogen, halogen, alkyl, and alkoxy, the alkyl radical in said alkyl and alkoxy substituents containing up to four carbon atoms, and at least one and at most two of X, Y, and Z being halogen.

3. A herbicidally active trisubstituted urea compound represented by the formula

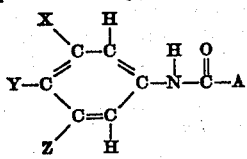

where A is a secondary amino radical selected from the group consisting of methylpropylamino, methylbutylamino and diethylamino radicals, X and Z are selected from the group consisting of hydrogen and halogen, and Y is selected from the group consisting of hydrogen, halogen, alkyl, and alkoxy, the alkyl radical in said alkyl and alkoxy substituents containing up to four carbon atoms, and at least one and at most two of X, Y, and Z being halogen.

4. 3-(3,4-dichlorophenyl)-1,1-diethylurea.
5. 3 - (3,4 - dichlorophenyl) - 1 - methyl - 1-isopropylurea.
6. 3 - (3,4 - dichlorophenyl) - 1 - methyl - 1-n-butylurea.
7. 3 - (3,4 - dichlorophenyl) - 1 - methyl - 1 - sec.butylurea.
8. A composition of claim 2 containing a surface-active dispersing agent in amount sufficient to impart water dispersibility to the composition.

CHARLES W. TODD.

References Cited in the file of this patent

UNITED STATES PATENTS

| Number | Name | Date |
|---|---|---|
| 2,029,959 | Urbain | Feb. 4, 1936 |
| 2,210,442 | Balle | Aug. 6, 1940 |
| 2,280,756 | Sankaitis | Apr. 21, 1942 |
| 2,322,761 | Lontz | June 29, 1943 |
| 2,341,868 | Hitchcock et al. | Feb. 15, 1944 |
| 2,374,485 | Haury | Apr. 24, 1945 |
| 2,412,510 | Jones | Dec. 10, 1946 |
| 2,472,347 | Sexton | June 7, 1949 |

FOREIGN PATENTS

| Number | Country | Date |
|---|---|---|
| 574,995 | Great Britain | Jan. 30, 1946 |

OTHER REFERENCES

Thompson et al., "Botanical Gazette," vol. 107 (1946), pp. 494 and 498.

Hunter, "J. Chem. Soc." (London) 1927, pp. 1209 to 1213.